June 26, 1962  R. C. BENTON  3,040,604
INDEXING MECHANISM
Filed June 19, 1959  6 Sheets-Sheet 1

Fig. 1

INVENTOR.
Robert C. Benton
BY Webb, Mackey & Burden
HIS ATTORNEYS

June 26, 1962  R. C. BENTON  3,040,604
INDEXING MECHANISM
Filed June 19, 1959  6 Sheets-Sheet 3

INVENTOR.
Robert C. Benton
BY Webb, Mackey & Burden
HIS ATTORNEYS

June 26, 1962 R. C. BENTON 3,040,604
INDEXING MECHANISM
Filed June 19, 1959 6 Sheets-Sheet 5

INVENTOR.
Robert C. Benton
BY Webb, Mackey & Burden
HIS ATTORNEYS

United States Patent Office 3,040,604
Patented June 26, 1962

3,040,604
INDEXING MECHANISM
Robert C. Benton, State College, Pa., assignor to Centre Circuits, Inc., Pine Grove Mills, Pa., a corporation of Pennsylvania
Filed June 19, 1959, Ser. No. 821,568
10 Claims. (Cl. 77—64)

This application relates to indexing mechanism in general and especially mechanisms of this character for rapidly and accurately indexing work tools with respect to work to be subjected to treatment or other steps, e.g., drilling, routing, milling, piercing or blanking operations. It is particularly adapted to bring a drill press into exact position relative to unmarked drill hole points on workpieces, e.g., electrical printed circuit blanks for production drilling of the latter.

During a manufacturing operation requiring relative movement between a tool and a workpiece element for different point-to-point treatment of the latter, e.g., drilling the workpiece with holes which may be uniform as to size only or spacing only or neither, it has been the prior practice for automatic positioning machinery to reach the next hole point on each workpiece by two stages through a serial method of positioning. First, a large increment of movement is made at rapid speed but with very low accuracy, whereupon final positioning takes place at a slow speed to "inch" the elements accurately into their final relative position. Where for such purposes a drilling or other tool operation is automatically programmed from input data as well as automatically performed thereby at the proper time, the positioning time requires two or three seconds as satisfactory for simple workpieces on which only a few operations are performed (some speed of completion positioning takes as low as 1.5 seconds or less); the large increment and small increment data reading operations, which follow one another, likewise require two or three seconds although readings completed in the range of 0.8–1.5 seconds have been achieved using fairly expensive electronic tape reader equipment.

It will be apparent that higher positioning speeds performed along two coordinate axes are essential with intricate workpieces such as printed wiring boards, some of which require 200–300 holes of a given size per square foot of area with the final article selling for a unit cost less than $10.00. To avoid the difficulty of the machinery being tied up too long with each board, a drilling rate as high as 30 holes per minute becomes necessary, thus allotting no more than two seconds for each hole drilled in the board. With approximately half of the available two seconds' time being consumed for intervening operations including table clamping, automatic data recheck, indexing clamp and release, table release and so forth for each hole, and with an average of 2" hole-to-hole spacing on each board, it will be appreciated that approximately 0.5 second of the remaining balance must be utilized for actual drilling time. Under these circumstances, the allocated positioning time is 0.5 second per hole; and, therefore, the average positioning velocity maintained during each instant in which the work table and drill table are relatively moved is 4" per second although higher velocities are, of course, desirable. It follows that it is of decided advantage if not necessity in an application of the foregoing character to achieve higher speed indexing operations than heretofore attained with any accuracy in practice.

The present invention is particularly advantageous in the above connection so as to afford the requisite accuracy with time-savings where necessary. Briefly, with respect to the workpiece element and tool element, this invention involves relatively moving the elements through large increment positioning to an accurately predetermined approximately indexed position, simultaneously moving a separate indexing part through small increment positioning to an accurately predetermined position to which the workpiece element is to be finally aligned, and, lastly, establishing interengagement between the indexed element and the indexing part so as to relatively move the former and cause it to exactly line up with the latter. The last step indicated follows practically instantaneously as soon as the large and small increment positioning steps are accurately completed and consumed time is at a minimum in view of the fact that the actual positioning steps are taking place simultaneously. These positioning steps, of course, comprehend positioning along two perpendicular coordinate axes so as to bring about both a top-to-bottom adjustment and a left-to-right adjustment in their common plane concurrently.

Preferably, my apparatus for accomplishing the foregoing method is automatically programmed along both coordinate axes from tape or from a suitable data information source, and the steps are automatically performed so as to introduce drilled holes in the boards at high speeds. The conservation of time in this manner nevertheless enables highly accurate work to be performed provided, of course, that the data information input is similarly accurately predetermined.

In a modified form of the invention which is not dependent solely upon data input, I provide a light sensing head element which is carried by the tool, so as to be moved automatically to a formed hole in a master workpiece element which is to be duplicated on a board blank by said tool. My apparatus includes a positioning control for relatively moving the aforesaid two elements through large increment positioning to an approximately centered position in terms of the formed hole, simultaneously introducing a beam of light through that hole so as to project a light spot at a random point generally within and sensed by the head element and, finally, relatively moving said elements through final increment positioning thereof to a satisfied position of the light spot in which the support and the head accurately center on one another. Photoelectric cells are provided in the sensing head element in complementary fashion to one another for this purpose whereby, when the output of any photocell is reduced and its complementary photocell is increased, an error voltage is created in the positioning control causing the photocells to follow up the light spot through follow-up mechanism to produce accurate centering. It is evident that when the head element carried by the tool is accurately related along both coordinates to a fixed drill hole point in the master, the tool operation can then be automatically performed on the blank board and thus duplicate the point positioning of the hole required.

In the accompanying drawings, I have illustrated presently preferred embodiments of my invention, in which.

Figure 1:
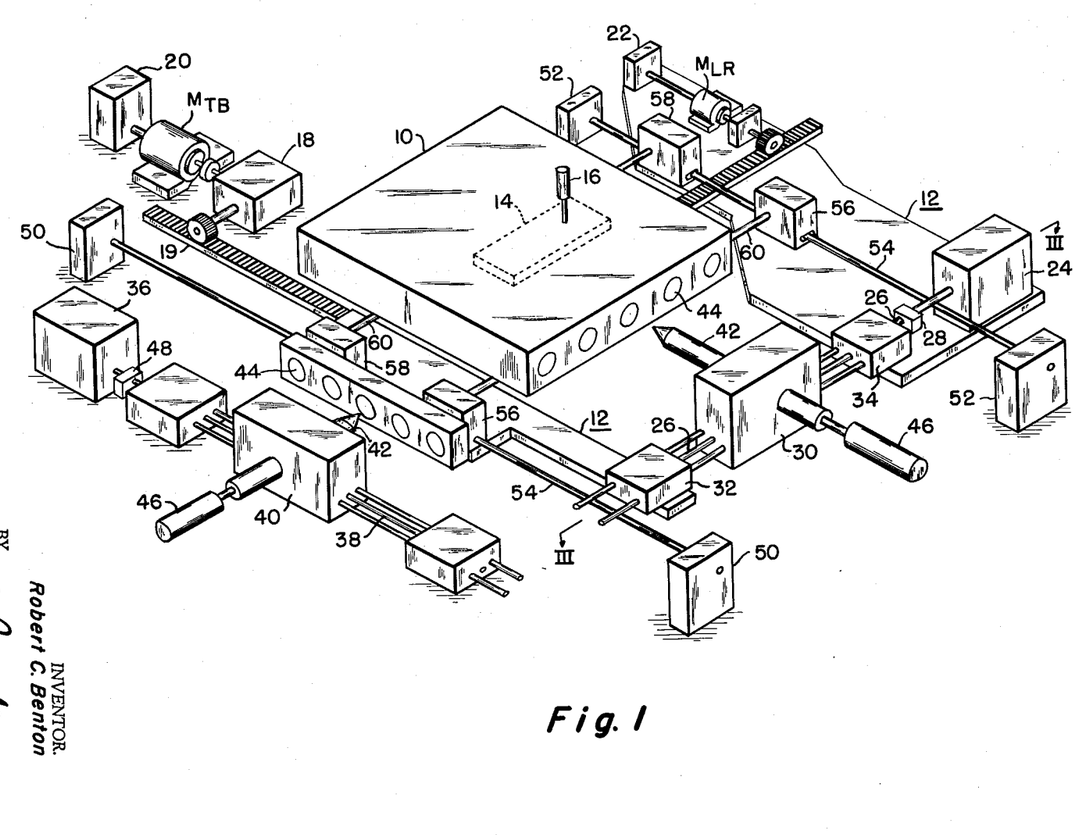
FIGURE 1 is a perspective view of my table indexing mechanism.

In FIGURE 1, I provide mechanism for indexing a work table 10 which is mounted for universal rectilinear movement in the plane of the table by means of a support 12. A workpiece 14 carried by the work table consists of a printed circuit board or blank adapted to be drilled by a drill press 16, operating along a fixed vertical axis. A forward-reverse clutch and motor assembly $M_{TB}$ is shaft connected through a gear reducer 18 and a rack and pinion 19 for moving the support 12 and the work table 10 in the top and bottom direction. An analog-to-digital converter 20 is connected to the motor shaft to sense the top and bottom position of the table for purposes of a digital feed-back control system hereinafter described. Another forward-reverse clutch and motor assembly $M_{LR}$ which is equipped with a similar gear reducer, rack and pinion, and an analog-to-digital converter 22 is operatively mounted on the support 12 to move the table 10 in the left and right direction.

A unit 24, consisting of a forward-reverse clutch and motor and a rotary analog-to-digital converter, is mounted to the support 12 to rotate a ball lead screw 26 which is controlled by a locking clamp 28 and which drives an indexing head 30. The head 30 is mounted on rods that are supported to ride upon a pair of opposite guide blocks 32 and 34, each being affixed to the support 12. A similar screw-drive unit 36 rotates a lead screw 38 and drives an indexing head 40 along a control axis relative to the work table 10, said heads 30 and 40 acting to lock the table in its proper top and bottom position and left and right position.

For this purpose, each indexing head carries a cone-shaped plunger 42 which is adapted to be received in one of a plurality of complementary cone-shaped sockets 44 carried on or adjacent the work table along two adjacent edges. The travel of each indexing head 30 and 40, owing to the predetermined spacing of its supporting guide blocks, is slightly greater than the distance center to center between adjacent sockets 44.

In operation of the apparatus of FIGURE 1, the motors $M_{TB}$ and $M_{LR}$ are automatically operated to cause the table 10 to carry the workpiece 14 to a position approximately under the drill 16. Simultaneously therewith, the units 24 and 36 move the indexing heads 30 and 40 through small increment positioning to a point substantially in alignment with the nearest socket 44 carried by the table. Thereupon, a plunger and cylinder actuator 46 provided on each indexing head functions through an effective longitudinally acting pressure area therein (not shown) to move the plungers 42 into seated positions within the sockets, thereby exerting a cross wedging action forcing the work table 10 into an accurately indexed position. The reaction in the indexing heads 30 and 40 is taken up by means of locking clamp 28 and a similar clamp 48 provided on the respective ball lead screws.

Figures 2, 3A:
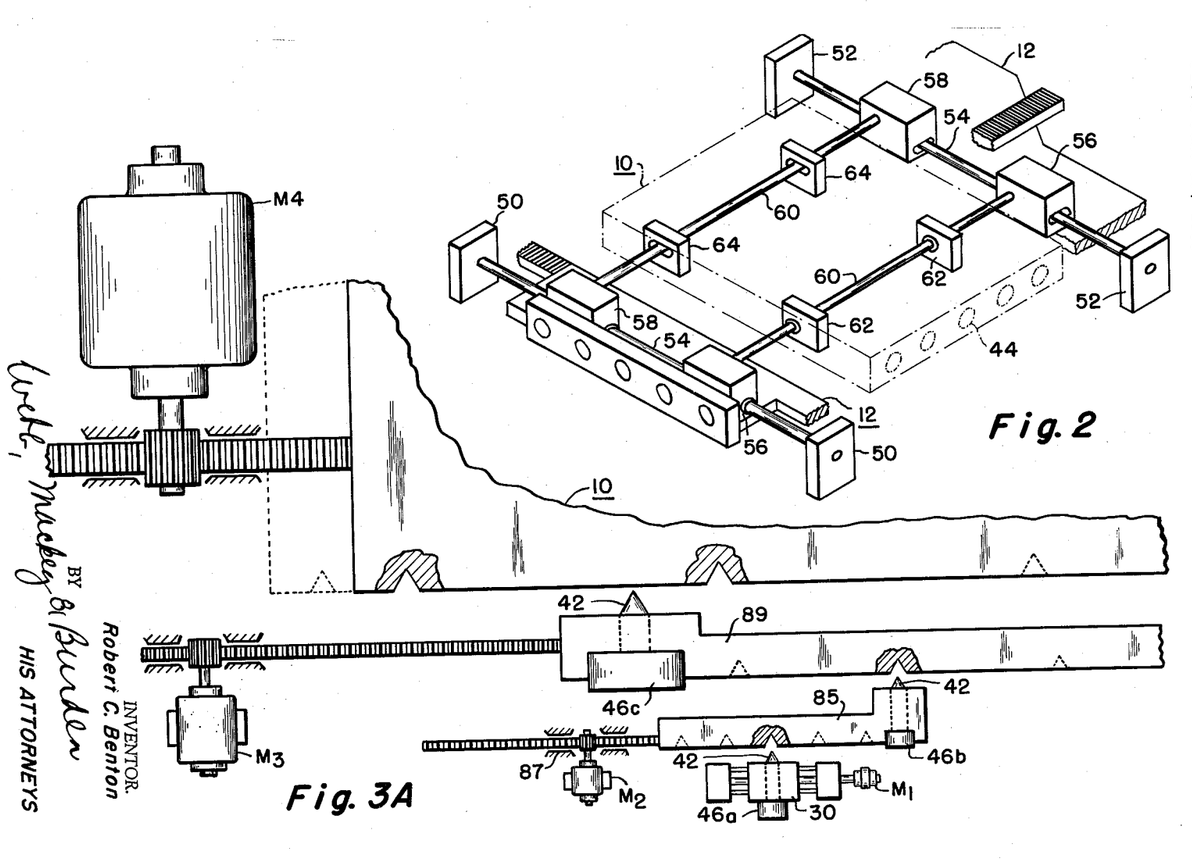
FIGURE 2 is a perspective view with portions of FIGURE 1 removed so as to clarify the table support.
FIGURE 3A is a view similar to FIGURE 3 showing a modification.

In FIGURE 2, pairs of fixed blocks 50 and 52 are set generally at the four corners of the support 12 and the movable work table 10 thereupon. These pairs of blocks carry rod-shaped ways 54 which are precision ground and hardened and of which the way 54 carried by the pair of blocks 50 constitutes a reference way. Pairs of blocks 56 and 58 to which the support 12 is fixed carry linear ball bushings (not shown) for rolling along the ways 54 and support another pair of ways 60 of which the way carried by the blocks 56 constitutes a reference way. Pairs of spaced apart table connected blocks 62 and 64 carry linear ball bushings (not shown) for rolling along the ways 60 and they directly support the table 10. It is essential only that the reference ways 54 and 60 carried by the respective blocks 50 and 56 have linear ball roller bushings associated therewith; and as actually illustrated in FIGURE 2, their companion ways fit within slots in the blocks associated therewith and supported thereupon, thus allowing for expansion and contraction in the structure.

It is evident that with the arrangement of the support 12 in FIGURE 2, the work table 10 is provided with universal movement in both of the rectilinear coordinate directions in its own plane enabling the workpiece thereon to be precisely positioned thereby as required.

Figure 3:
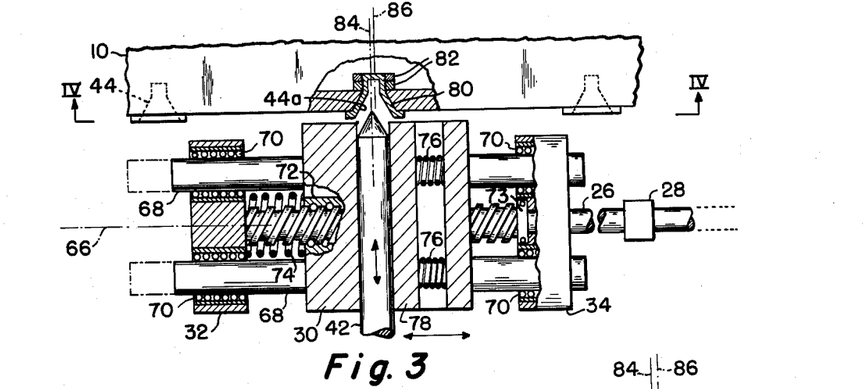
FIGURE 3 is a section in plan taken along the section lines III—III of FIGURE 1.
Figure 4:
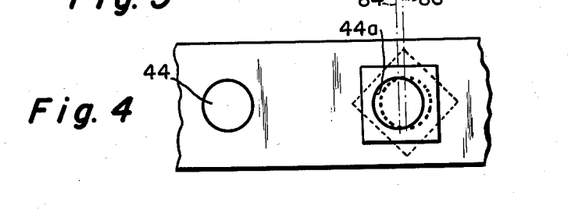
FIGURE 4 is a face view taken along the lines IV—IV in FIGURE 3.

In FIGURES 3 and 4, it is noted that the indexing head 30 travels along a control axis 66 closely adjacent one of the edges of the work table 10 carrying the sockets 44. The indexing head 30 carries fixed precision ground rods 68 which, at their opposite ends, are supported to ride in linear ball bushings 70 carried by the respective guide blocks 32 and 34. The indexing head 30 further carries two ball nuts, one of which is shown at 72, which are arranged back to back therewithin in surrounding relation to the ball nut lead screw 26. The ball nut lead screw passes from the clamp 28 through registering openings in the respective guide blocks 34 and 32 wherein it is set in bearings for rotation along the fixed axis 66. A pair of collars, one of which is indicated at 73, is secured to the lead screw 26 in spaced points to prevent it from moving axially with respect to the guide blocks 32 and 34.

One spring 74 which thrusts at one end against the guide block 32 and at the other end against the indexing head 30 surrounds the lead screw 26 to eliminate slack in the system; a pair of compression springs 76 thrusts against a movable jaw 78 in the indexing head 30 so as to clamp the plunger 42 carried thereby against movement out of a vertical plane although the plunger 42 has slight freedom of movement in the vertical direction for the reason explained immediately hereinafter.

In order to provide for precision center-to-center alignment between adjacent sockets 44, an insert element 80 is provided at fixed intervals and seated within a machined socket in the edge of the table 10. The insert 80 is hardened and held by a pair of lock nuts 82 which are relatively rotatable to lock the insert in any angular rotation desired within its receiving socket. A bevel or cone-shaped socket 44a within the insert corresponds to the sockets 44 in alignment therewith but has an eccentric axis 84 relative to the main axis 86 for the insert 80. An adjustment is thus provided so as to bring the socket axis to an exact center-to-center distance with reference to the adjacent socket 44. Inasmuch as the beveled or cone-shaped plunger 42 is capable of limited movement in the vertical direction as above indicated, the slight misalignment necessitated in the center line of the socket 44a in the vertical direction is readily accommodated.

In the modification of FIGURE 3A, a small increment positioning head 30 and an excessively large increment positioning table or table-connected member, both indicated at 10, correspond in general to the like devices of FIGURE 3 just discussed. However, when the cylinder 46a of the head 30 is operated, the advancing plunger 42 engages an appropriate adjacent socket in one of two intermediate increment positioning heads 85 and 89. The head 85 is positioned by means of an automatically controlled intermediate increment positioning motor $M_2$ which has a rack and pinion connection to the former and which is locked at an appropriate time automatically by means of a set of clamps 87. The head 85 carries a cylinder 46b which operates the associated plunger 42 into a socket on the second intermediate increment positioning head 89. The head 89 is similarly controlled through a rack and pinion by means of a somewhat larger motor $M_3$ under control of a set of clamps engageable with the rack thereof. A cylinder 46c on the head 89 operates to drive an associated plunger 42 into a socket carried by the table or table-connected member 10.

The table-connected member 10 is subject to exceedingly large increment positioning by means of a motor $M_4$, such as suitable in the example of a boring mill in which the bed runs up to 100 feet or longer. Similarly, a rack and pinion drive and a set of clamps operate to hold the table-connected member stationary prior to boring.

In the operation, the motors $M_1$, $M_2$, $M_3$, and $M_4$ of FIGURE 3A are simultaneously energized bringing the respective elements positioned thereby into a rough alignment whereby each plunger 42 substantially confronts a socket on the next adjacent head element. The cylinder 46a is then operated whereupon the plunger 42 wedges the intermediate head 85 into exact alignment with the reference head 30. Thereupon, the clamps 87 are operated to lock the head 85. The cylinder 46b is then automatically operated whereupon the associated plunger 42 brings the second intermediate head 89 into a position exactly referenced to the small increment positioning head 30 and thereupon the clamps lock the head 89. At that point, the heavy cylinder 46c drives the associated plunger 42 into the confronting socket on the table-connected member 10 so that when the latter is perfectly referenced with respect to the head 30, the clamps effective on the table-connected member 10 lock it solidly for a subsequent boring operation.

In this way, the small increment, the two intermediate increment and the exceedingly large increment positioning motors are operated simultaneously to effect a time saving; and when this adjustment period is terminated, the motors are stopped and the cylinders 46a, 46b and 46c are rapidly operated in succession to complete the highly accurate positioning.

Data input control for the apparatus of FIGURE 1 can be provided from conventional punched cards, magnetic tape, or with a practical view to the economics of the operations intended, by punched paper tape which is preferred for that reason. Desirably, an eight-binary-digit input is introduced into each of the two coarse settings for the table 10 for control of both its left-to-right and its top-to-bottom positioning. A second set of eight binary digits to each of the fine or small increment settings is contemplated for the indexing heads 30 and 40. In considering the specific dimensions of the work table in analogous terms to the digital control just referred to, it will be seen that highly accurate settings can be accomplished, preferably with a minimum positioning accuracy of plus or minus 0.002" over a 15" by 15" area.

Figure 5:
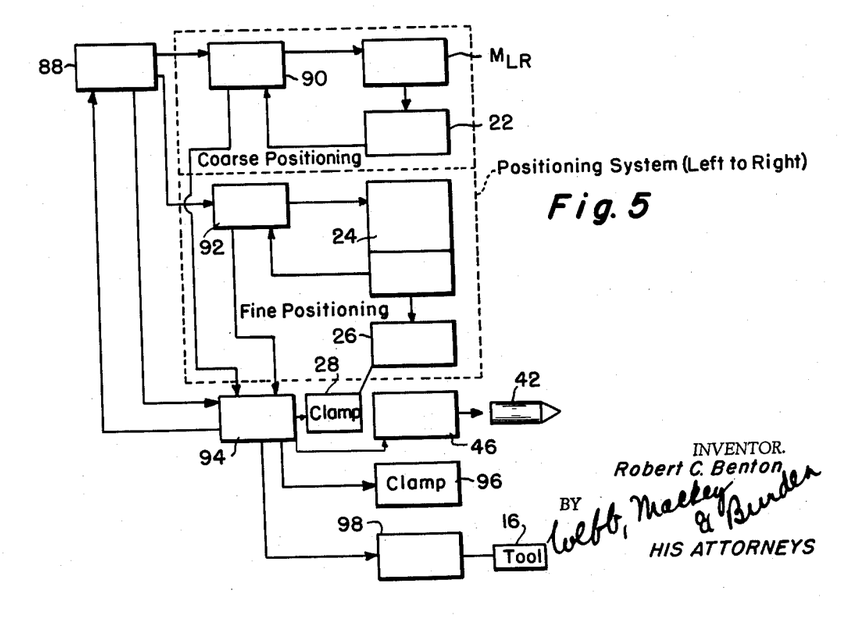
FIGURE 5 is a block diagram of a control system for the mechanism of FIGURE 1.

A portion of a control system for operating the left-to-right positioning is shown in FIGURE 5. The analog-to-digital converters 22 and 24 for the respective table and for the indexing head 30 are adapted in conjunction with a tape reader 88 to introduce feedback data and original data into a table controller 90 and into a pin controller 92 indicated by block diagram. The table controller 90 controls the left and right positioning motor $M_{LR}$ for the table and the progressive positions taken by that table are mechanically introduced into the analog-to-digital converter 22 which thus in the role as a table position reader continuously supplies digitally encoded feedback readings. In like manner, the indexing head controller 92 operates the unit 24 which houses the forward reverse clutch and motor assembly and the rotary analog-to-digital converter connected to the ball lead screw 26. The feedback and original information being supplied by the respective converters and the tape reader 88 are correlated in a manner hereinafter described.

A sequential programmer 94 receives information supplied from the table controller 90 and from the plunger controller 92; and when it detects that these controllers have reached their satisfied positions, the sequential programmer initiates a series of sequential steps. First, it sets the lead screw clamp 28 on the lead screw 26 to prevent the indexing head 30 from moving; second, it actuates the plunger cylinder 46 to operate the plunger 42 into its reception socket 44; third, it operates a table clamp 96 to prevent the table from moving during a drilling operation, and thence it operates a tool selector and actuator 98 which controls the drill 16.

It will be apparent in the operation of the control system of FIGURE 5 that the clutches both in the forward-reverse clutch and motor assembly $M_{LR}$ and in the combined unit 24 are disengaged prior to the actuation of the plunger 42. After the drilling operation is completed and the drill is withdrawn by the programmer 94, the programmer thereafter actuates the tape reader 88 to advance to another data block, the plunger 42 is caused to be withdrawn by the cylinder 46, and the clutches just referred to are re-engaged immediately upon start of the next point-to-point positioning operation.

A similar positioning system for controlling the table 10 in its top-to-bottom operation will be employed under control of the tape reader 88 and corresponding feedback data handling and the operation will be similar to the one just described. These operations, of course, transpire simultaneously giving the table a dual positioning action with a consequent time-saving being afforded.

Figure 6:
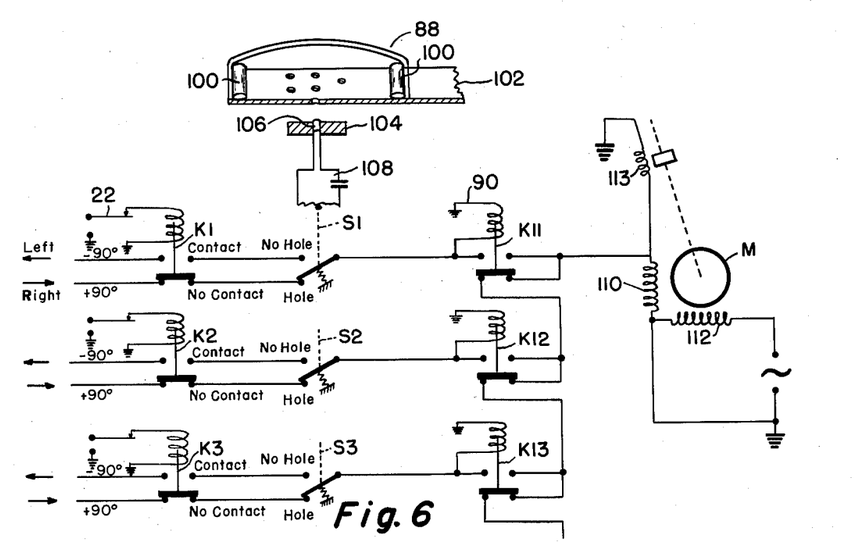
FIGURE 6 is a schematic diagram of a portion of the controls of the block diagram of FIGURE 5.

A portion of the control system of FIGURE 5 is schematically indicated in FIGURE 6, the purpose being to control a motor M corresponding to the motor in either of the head positioning units 24 and 36 or the top-to-bottom positioning motor $M_{TB}$ or the left-to-right positioning motor $M_{LR}$. Let it be assumed that the motor M is employed to perform the function of the preceding motor $M_{LR}$.

The tape reader 88 has a pressurized chamber containing tape drive rollers 100 which repetitively advance punched paper tape 102 along a surface 104 across which it slides. The tape has a plurality of openings punched for binary coding, each of which registers with a separate opening 106 formed in the surface 104. The respective openings 106 control a series of switches S1, S2, S3 and so forth, each operated by an individual pressure capsule 108. Whenever a hole in the tape 102 registers with an opening 106, pressure from the pressurized reader 88 passes into the capsule 108 to direct the corresponding switch to its downward position as shown in solid lines in FIGURE 6; otherwise, a spring returns the switch to its corresponding upper no-hole position.

A contact in the rotary-to-digital converter 22 operates an electromagnetic relay K1 so as to move it from its lower position shown in solid lines to an upper energized position, and this contact in the converter is closed or not dependent upon whether the work table returns feedback settings indicating a satisfied or an unsatisfied position to the table controller 90. The converter 22 in this fashion controls whether a 90° leading or a 90° lagging voltage is available to be supplied to the relay K11 in the table controller 90. Similar contacts in the converter 22 control other electromagnetic relays K2, K3, and so forth, each one supplying a different channel of information which must be brought into coincidence with the binary channels of input data information from the tape reader 88. Until these channels are brought into coincidence, the respective electromagnetic relays K11, K12 and K13 within the table controller 90 are held in their unsatisfied upper position owing to the fact that these relays remain energized.

The electromagnetic relays K11, K12 and K13 are connected to a control winding 110 which is physically set at 90° angularity to a power phase or reference winding 112 in the forward-reverse clutch and motor M. In well-known manner and depending upon whether a 90° leading voltage or a 90° lagging voltage is fed to the control winding 110, the resulting rotating field in the motor M causes it to be rotated in one direction or in the opposite direction tending to move the table appropriately leftwardly or rightwardly so as to cause the feedback data from the converter 22 to coincide with the input data from the tape reader 88. A clutch solenoid 113 in the clutch and motor M operates to declutch the latter automatically when it quits rotating, but simultaneously reengages the clutch when the motor restarts.

The relays K11, K12 and K13 which serve the various channels of binary coded information corresponding to the desired numerical table position operate in a sequential manner to make the major table corrections first and to eliminate delay by ignoring any channel of information which is already satisfied. That is to say, if the relay K11 is energized with either a 90° lagging or leading voltage so as to assume its upward position, this voltage is continuously impressed upon the control winding 110 until the feedback information from that channel of the converter 22 becomes satisfied. At that point, the electromagnetic relay K1 operates in a proper direction to deenergize the electromagnetic relay K11 and thereby the motor M comes under the direct voltage of the relays K12 and K13. If the relay K12, for instance, is already deenergized owing to the feedback relay K2 therefor being satisfied, there is no attendant delay for considering this channel of information and the control of relay K13 over the control winding 110 is automatically effective.

The tape 102 of FIGURE 6 similarly controls the other three motors through appropriate mechanism, not shown, and in this fashion, the work table 10 is expeditiously advanced in its point-to-point positioning as dictated by the punched tape 102. Eight sets of eight digit binary codes are necessary for this operation, two sets being necessary for the coarse and fine adjustment of each of the motors $M_{TB}$, $M_{LR}$, unit 24 and unit 26. As above indicated, these tapes are pre-punched with the punching data being determined from scale drawings or from scale measurements on a direct master board which is to be duplicated on the board blanks.

Figure 7:
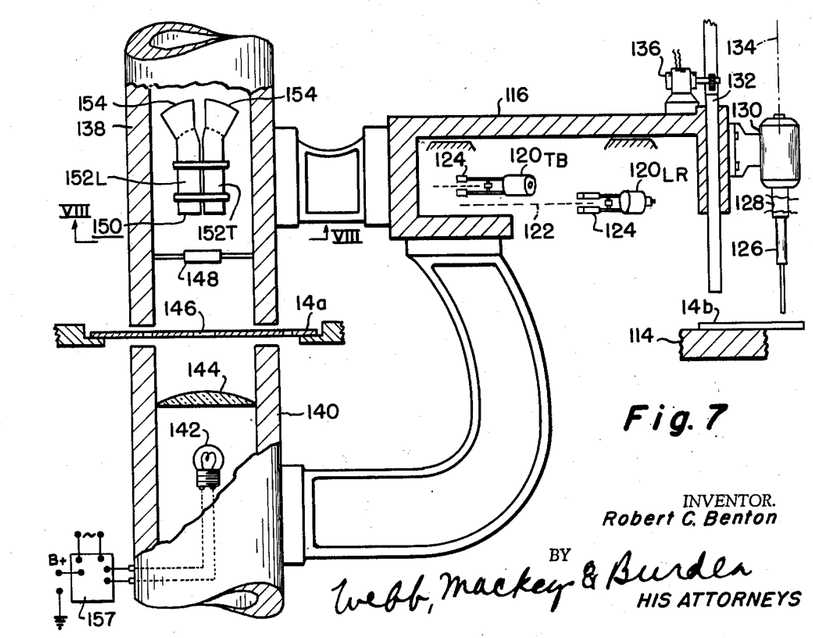
FIGURE 7 is a fragmentary view of the modification of the present invention having photocell follow-up mechanism.
Figure 8:
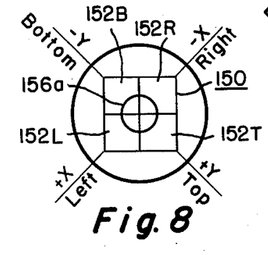
FIGURE 8 is a transverse sectional view taken along the lines VIII—VIII of FIGURE 7.

A modification of the invention is shown in FIGURES 7 and 8 whereby the final positioning can be accomplished directly from a master board or template which is pre-drilled. The master board is indicated at 14a having a fixed support and a board blank to be drilled to conform to the master is indicated at 14b having a fixed support table 114. A drill table 116 is supported for universal movement in the two rectilinear directions in its own plane and is operated by a motor $120_{TB}$ and by a second motor $120_{LR}$. Each of these motors operates a suitable rack and pinion or a lead screw 122 which has a pair of automatically operated clamps 124 associated therewith. One or a series of stepped drills 126, 128 and 130 has mounting means 132 by which they are movable on their individual vertical axes 134. A drill feed mechanism is schematically indicated at 136 for extensibly and retractively controlling the individual motor mounting means 132. The depth of feed of each drill determines the final size of the opening formed in the board blank 14b.

The work table 116 has brackets by which it rigidly carries a sensing head 138 and shield 140, the head and the shield being vertically spaced apart so as to universally move in opposite confronting planes to the plane of the master board 14a. The light shield 140 carries a neon bulb 142 which through a collimating lens 144 directs collimated light through confronting holes 146 occurring in the master 14a. The collimated light thus passes as a beam through a registering dual-function lens 148. It enlarges the beam and at the same time focuses same in the direction of a bundle of four light guide elements 152B, 152R, 152T, and 152L which are of elongated shape with square cross section and made of clear plastic such as Plexiglas but preferably Lucite rods.

The plurality of adjacent end surfaces of the Lucite rods collectively presents one common square area 150 to receive the focused light which is conducted therefrom in the body of the plastic material and is thus made available for distribution to photocells. Individual to each of the opposite ends of these Lucite rods, which may diverge in order to provide more clearance space, there is provided a set of four complementary photocells 154, each being sensitive to the portion of the light distributed by the corresponding Lucite rods. When the spot of light emitted from the hole 146 appears at the position 156A which by visual inspection can be seen by the crossed lines to be accurately centered in the area 150 shown in FIGURE 8, all four photocells are equally excited and their output is equal.

Preferably, pulsating light is emitted through the hole 146 by the neon bulb 142, this bulb being supplied by a source 157 with steady direct current which is under sufficient voltage (70–110 v. D.C.) to keep the bulb illuminated at all times and over which there is superimposed a 30-cycle A.C. or 60-cycle equivalent pulsating D.C. ripple voltage. The ripple voltage is the component relied on in the photocells 154 and the steady light on which the ripple voltage is superimposed is for the purpose of reducing the side effects of room light or other ambient light from external sources of illumination that leaks past the light shield 140.

For this reason, the output of the four photocells 154 when they are in exact balance consists of coordinated, similar sine waves.

Figure 9:
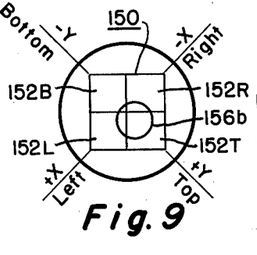
FIGURE 9 is a transverse section similar to FIGURE 8 with a slight variation in relative displacement.
Figure 10:
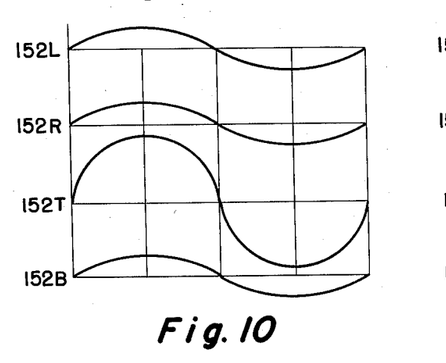
FIGURE 10 is a graph showing the photocell output curves appropriate to FIGURE 9.

FIGURES 9 and 10 illustrate the influence of the light spot when it takes a displaced position 156B relative to the light-receiving surface 150. The complementary pair of Lucite rods 152B and 152T define a diagonal reference axis +Y and —Y for measuring displacement of the light spot 156B in the top-to-bottom direction, and the shift in the +Y direction excites one of these companion photocells with more light than the other. On the other hand, the common diagonal reference axis of the rods 152R and 152L has the spot 156B relatively centered with respect to +X and —X measurements thereof and the photocells sense no unbalance along that coordinate axis. The light traveling in the Lucite rods introduces a photocell output in accordance with FIGURE 10 from which it can be seen that the photocell receiving light from the rod 152T will be excited considerably more than any of the other photocells.

Figure 11:
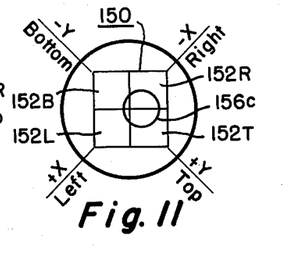
FIGURES 11 and 12 correspond to FIGURES 9 and 10 except for a further relative displacement.
Figure 12:
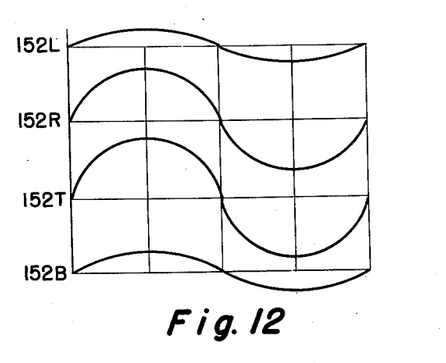

FIGURES 11 and 12 correspond to FIGURES 9 and 10 except for the fact that the light spot on the surface 150 has transferred to a position 156C in which it is off center with respect to both +X, —X, and +Y, —Y axes. In that event, the output of the photocells supplied by the respective Lucite rods 152L and 152B is seen to be diminished according to FIGURE 12. whereas the output due to light traveling through the rods 152R and 152T has a substantial magnitude. These outputs are available to operate a control system causing the sensing head 138 of FIGURE 7 to take an exactly centered final position with respect to each drill hole in the master 14a. While the drills 126, 128 and 130 may be expeditiously advanced from point to point and coarsely pre-set by hand relative to the blank 14b to be drilled, preferably a data information system similar to the foregoing embodiment will be employed to bring the sensing head 138 into the immediate vicinity of each hole 146; in either case, it is thereafter followed up and precisely centered upon automatically.

Figure 13:
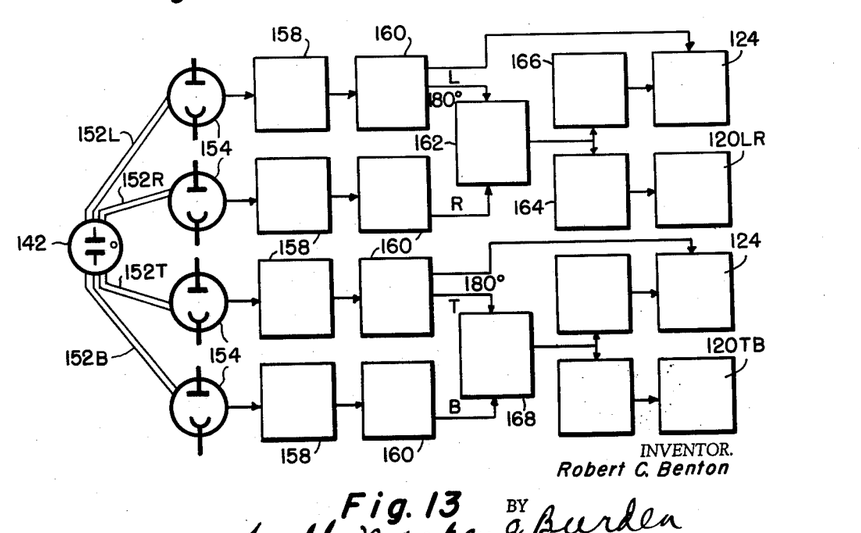
FIGURE 13 is a block diagram of the main control system for the photocell follow-up mechanism of FIGURE 7.

A follow-up control system for performing the centering operation just described in response to the photocell signals is shown in block diagram form in FIGURE 13. The respective Lucite rods 152L, 152T, 152B, and 152R communicate the pulsating light from the neon bulb 142 to the photocells 154 which, in response to the A.C. ripple voltage component thereof, introduce an A.C. signal into individual amplifiers 158. The amplified output from each photocell is compared to that of its complementary photocell by first passing it through a phase splitter 160 making available both in-phase and out-of-phase signals. An in-phase signal from the right or −X axial direction is introduced into one side of a comparison adder 162 and an out-of-phase signal from the left or +X direction is introduced into the opposite side of that adder so that as combined, they cancel one another if of equal and opposite magnitudes. If they are of unequal magnitudes, e.g., indicative of a displacement in the −X direction in accordance with FIGURE 11 hereinabove, a comparative error voltage is introduced by the adder into a servo-amplifier 164 which immediately operates the motor 120$_{LR}$ of FIGURE 7. This motor thereupon moves the drill table 116 and the sensing head 138 to a position in which the light spot reaches the satisfied position 156A of FIGURE 8, i.e., the sensing head operates with a follow-up servo-mechanism action to make the area 150 follow up to the point to which the data input has caused the light spot to be displaced among the coordinates in that area. At this point, a satisfied-position detector 166 actuates the table lock clamp 124 of FIGURE 7 and locks the table for a drilling operation.

In a similar manner and with like amplifiers and phase splitters, a top-to-bottom adder 168 is provided to control the motor 120$_{TB}$ and is either interlocked with the clamp 124 above or another clamp 124 is provided to lock the table along the +Y and −Y axis. This adjustment prior to locking takes place simultaneously with the +X, −X adjustment; and at the proper time, the right drill is operated and to the right depth.

Figure 14:
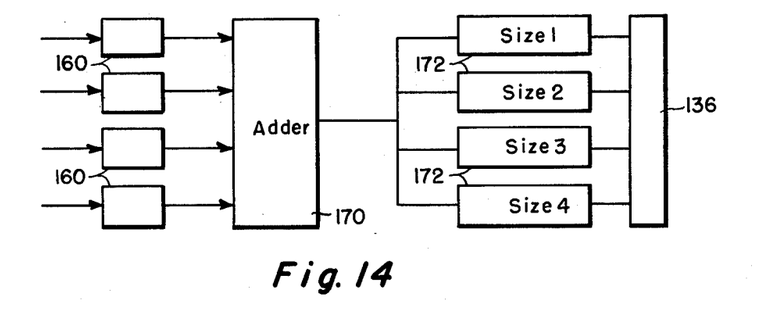
FIGURE 14 is a block diagram of a further portion of the main control system.

FIGURE 14 is a block diagram showing how the selection of the drill and its penetration to the proper depth is accomplished. An in-phase signal from each of the phase splitters 160 is fed into a common adder 170 for combining them; in this fashion, the sum voltage output of the four photocells is made available. Inasmuch as the light spot is approximately centered at this point, the output of each photocell is approximately one fourth of the sum. This sum voltage is compared to a group of known reference voltage values within a series of graduated comparators 172 for determining the proper drill hole size signal which is communicated by the comparators to the drill feed control mechanism 136. As above indicated, the depth of feed of each stepped drill controls the resulting hole size by predetermining the depth of penetration to be reached in the blank 14b.

Figure 15:
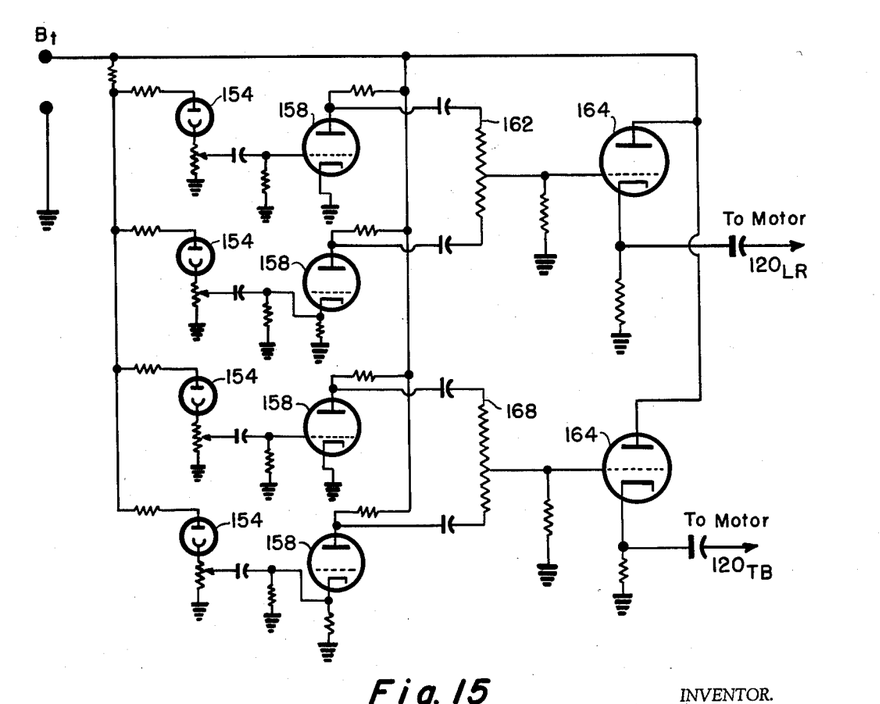
FIGURE 15 is a schematic diagram of a portion of the block system of FIGURE 13.

Illustrative of one example of photocell error comparator is the schematic electronic circuit of FIGURE 15 for controlling the fine adjustment of the respective motors 120$_{LR}$ and 120$_{TB}$ of FIGURES 7 and 13 preceding. The sine wave output from each of the four photocells 154 is individually capacitance coupled to vacuum tube amplifiers 158 corresponding to the schematic blocks 158 of FIGURE 13 preceding. A left-to-right adder 162 of the resistive type which corresponds to the block 162 of FIGURE 13 is capacitance coupled at each end to a different one of the amplifiers 158 appropriately thereto, and the output therefrom is applied to the grid of a servo-amplifier tube 164. The amplifier tube 164 is capacitance coupled to the motor 120$_{LR}$ which may be of the two-phase servo type similar to the motor M of FIGURE 6 in the preceding embodiment. That is to say, the motor 120$_{LR}$ (not shown) has a power phase or reference winding which is physically set at 90° to a field control winding under control of the servo-amplifier 164.

With reference to the power phase winding, the so-called in-phase and out-of-phase outputs from the servo-amplifier are impressed as relatively 90° leading and 90° lagging voltages on said control winding. The resulting rotating field, depending on the dominance of the leading or lagging voltage for its direction of rotation, causes the motor 120$_{LR}$ (not shown) to rotate in the proper direction to satisfy the error voltage of a complementary pair of the four photocells 154.

Another resistive adder 168 in FIGURE 15 similarly supplies in-phase and out-of-phase voltage signals to another servo-amplifier 164 which controls the motor 120$_{TB}$ (not shown). The motor 120$_{TB}$ is a two-phase servo motor similar to the preceding motor 120$_{LR}$ except that these motors are physically related along perpendicular coordinates to one another for moving the table respectively in the top-to-bottom and the left-to-right directions. For purposes of either direction, the electronic comparator recognizes which photocell or photocells have the larger output and directs the motors to move the sensing head in the proper direction to make the outputs of all cells equal.

In operation of the preceding embodiments of FIGURES 1 and 7, the relatively movable one of the tables is advanced point by point to bring the tool element and the blank element to be drilled into the proper relationship for drilling. After the required number of holes of proper point-to-point spacing and size are drilled, the board blank is removed by hand or by automatic ejectment machinery as appropriate; another undrilled blank is substituted and prior thereto or immediately following, the work table is restored to its starting position.

The operation is then repeated.

As herein disclosed, the drawing shows a clamp 28 and another clamp 96 in FIGURE 5 for clamping the respective indexing head 30 and the table 10 in proper position prior to drilling, the positioning motors being automatically declutched beforehand. A similar clamp 48 is provided in FIGURE 1 for clamping the opposite indexing head 40 prior to clamping the table. In the embodiment of FIGURE 7, a clamp 124, as above indicated, is employed to clamp the drill table 116 along the axis 122 and a similar clamp used on the shaft of the companion motor 120$_{TB}$ is necessary for the reason that the servo system of FIGURE 7 is undamped; the two clamps just referred to are preferably automatically actuated 50 milliseconds after the error voltage has gone to zero provided, of course, the photocell outputs are maintained above a predetermined level at this point. That is to say, the error voltage is zero when no hole is registering with the sensing head inasmuch as the cell output is zero under such circumstances and it is, of course, essential that the clamps do not operate before a hole approaches the vicinity of the sensing head 138.

It is evident that the principles hereof are equally applicable to the relatively movable table in either system of the type generally as shown in FIGURES 1 and 7 herein, it being immaterial in principle whether a drill table or multiple spindle drill or a tool moves relative to a work table which is fixed, or vice versa.

While I have described certain present preferred embodiments of my invention, it is to be understood that it may be otherwise embodied within the scope of the appended claims.

I claim:
1. In an indexing table, a table-connected element, indexing means therefor, first and second positioning means individual to said element and said indexing means respectively to simultaneously move same along axes into preset positions side by side, and means for causing relative movement of engagement transversely between said indexing means and said table-connected element, said engagement occurring at a predetermined point on the latter and with the table-connected element accommodating thereto so as to adjust and exactly line up at that point with the preset position of said indexing means.

2. In an indexing table, a table-connected element, plural indexing means therefor, positioning means individual to said element and said indexing means respectively to simultaneously move said element and said plural means along axes into preset positions side by side, and means for causing relative movement of engagement of said indexing means transversely with respect to one another and to said table-connected element, said engagement occurring at a predetermined location on the latter and with the table-connected element accommodating thereto so as to adjust and exactly line up at that location with the preset positions of all of said indexing means.

3. In an indexing table, a table-connected element, an indexing element therefor, large increment and small increment positioning means to move said elements into respective preset positions side by side with the indexing element proceeding thereto along an axis of control to the finer one of the settings, and means for causing relative movement of engagement transversely between said elements with the engagement occurring at a predetermined point on the table-connected element and with the latter accommodating thereto so as to adjust from its coarse setting and exactly line up at said point with the preset position of said indexing element.

4. In an indexing table, a table-connected element, a plurality of indexing elements therefor, large increment and small increment positioning means to move said table-connected element and one of said indexing elements into respective preset positions in confrontation to one another with the one indexing element proceeding thereto along an axis of control to the finer one of the ultimate settings, there being at least one intermediate increment positioning means connected to move another of said indexing elements along an axis of control to an intervening operative point between said one element and said table-connected element, and means for causing relative movement of engagement transversely between and among said indexing elements and said table-connected element with the engagement occurring at a predetermined point on the table-connected element and with the latter accommodating thereto so as to ultimately adjust from its coarse setting and exactly line up at said point with said intervening other element in its ultimately accommodated-for position with respect to the finer preset position of said one indexing element.

5. Indexing table structure comprising in combination, a table member for supporting a workpiece, supporting means mounting said table member for universal rectilinear movement in the plane of the table member, indexing mechanisms disposed along different transverse sides of the table member and each movable along an axis of control to a preset position, and table positioning means carried by each indexing mechanism and engageable with means at the sides of the table member to move the latter into an indexed relation fixed in two directions in accordance with said preset positions.

6. Indexing table structure for workpieces comprising in combination, a table for supporting a workpiece, supporting means mounting said table for universal rectilinear movement in the plane of the table member, indexing mechanisms disposed along different transverse sides of the table and having means for moving each along an axis of control to a preset position, table positioning means for concurrently therewith moving said table into a position with predetermined points thereon simultaneously taking positions of at least coarse prealignment with the respective preset positions being taken by said indexing mechanisms, and table positioning means individual to said indexing mechanisms operative to engage said table and bring said prealigned points thereon into a position of exact alignment with and fixed in two directions by said indexing mechanisms.

7. In indexing mechanism to cause a coarsely prealigned table element to follow-up to an accurately indexed position, the combination comprising said table element, an indexing element with which the table element is prealigned and which has means connected thereto for moving same into an accurately indexed position, and a plunger having means of attachment to one of said elements and having power means connected thereto to move the plunger into engagement with means on the other element with the resulting engagement bringing said table element into exact alignment with the indexed position of the indexing element.

8. In indexing structure to cause a coarsely prealigned table to follow-up to an accurately indexed position, the combination with said table, of mechanism with which the table is adapted to take a confronting position and which has means connected thereto for moving same into an accurately fixed position along a control axis thereadjacent, and indexing means including a cone-tipped plunger and cylinder and carried by said mechanism, said plunger and cylinder having an effective longitudinally acting pressure area acting to move the cone-tipped end of the plunger of said indexing means into engagement with complementarily cone-shaped socket means on the table, with the resultant wedged engagement bringing said table into an accurately indexed position corresponding to that of said mechanism.

9. The combination of claim 8 wherein the last-named means on said table comprises a socket element fitting within a mounting socket and with the aforesaid cone-shaped socket eccentric thereto, and releasable angularly rotatable means for releasably seating said socket element so as to alter the eccentric adjustment thereof in the mounting socket.

10. In a positioning table construction, table-connected structure and an indexing structure therefor, said structure supported for movement along adjacent parallel axes to one another, there being an element on each of said structures engageable with at least one element carried at a point on the other structure for establishing alignment at that point, data input reader means for dictating a succession of accurate positions for said structures, large increment and fractional increment positioning means to move said structures into respective preset positions side by side with the indexing structure proceeding thereto along an axis of control to the finer one of said settings according to the fractional increments, automatic means operated by said input data reader means and connected to the large increment and fractional increment positioning means to simultaneously move said structures automatically between accurately indexed positions along their respective axes as dictated by said reader means, and means for causing relative movement of engagement transversely between engageable elements on said structures with the engagement occurring at a predetermined point on the table-connected structure and with the latter accommodating thereto so as to adjust from its large increment setting and exactly line up at said point with the preset fractional increment position of said indexing structure.

References Cited in the file of this patent

UNITED STATES PATENTS

| | | |
|---|---|---|
| 1,703,549 | Sergeeff | Feb. 26, 1929 |
| 2,479,293 | Bayless | Aug. 16, 1949 |
| 2,791,136 | Smith | May 7, 1957 |
| 2,870,660 | Chausson | Jan. 27, 1959 |
| 2,873,629 | Frautschi et al. | Feb. 17, 1959 |
| 2,880,632 | Charlat | Apr. 7, 1959 |